Patented Jan. 19, 1926.

1,570,438

UNITED STATES PATENT OFFICE.

SAMUEL MARSHALL EVANS, OF ESSEX FELLS, NEW JERSEY.

METHOD OF PRODUCING LEAD OXIDE.

No Drawing. Application filed March 5, 1923. Serial No. 623,022.

*To all whom it may concern:*

Be it known that I, SAMUEL MARSHALL EVANS, a citizen of the United States of America, and resident of Essex Fells, in the county of Essex, in the State of New Jersey, have invented a certain new and useful Improvement in Methods of Producing Lead Oxide, of which the following is a true and exact description.

My invention relates generally to the treatment of lead sulphate or lead material containing lead sulphate, primarily to secure the complete conversion of the sulphate into lead hydroxid or carbonate from which other lead products can be made by any known or convenient treatment. More particularly, my invention relates to the production from the material of storage battery plates, which contains a large proportion of lead sulphate, of lead oxide free from sulphate.

It is known that lead sulphate treated with an alkaline base such as caustic soda will be converted into lead hydroxid but ordinarily the reaction with the lead sulphate is not complete for reasons explained in the patent to Hughes No. 1,033,405 of July 23, 1912, which describes a method involving the trituration of the reacting materials for effecting a complete conversion of the lead sulphate into the desired products.

My invention is based on my discovery that the presence in a mass of finely divided lead sulphate, or lead material including lead sulphate, of a small percentage of finely divided metallic lead, will, when the mass is treated with a hot solution of an alkaline base, or an alkaline carbonate, result in the complete conversion of the lead sulphate to the hydroxide or carbonate without trituration. The metallic lead in this treatment may be said to act as a reducing agent or as a catalyst and is, I believe, practically unaffected by the treatment in that it appears in the product.

Broadly speaking, my invention consists in the process of treating finely divided lead sulphate in admixture with finely divided lead with a hot alkaline base solution to convert the sulphate into a hydrate or carbonate.

More particularly I have in view the treatment of the paste portions of storage battery plates, primarily for the conversion of its lead sulphate component into a hydroxid or carbonate, and by, preference for the complete conversion of all the components of the paste into lead oxide suitable for reuse in the manufacture of battery plates or other uses, and my invention further consists in the described treatment of the battery plate material for this purpose involving as a part of the process my general method of converting the lead sulphate into a hydrate or carbonate.

Used battery plates are made up of lead grids supporting material, originally applied as a paste, and comprising lead sulphate, lead peroxide and sponge lead, and I first separate the friable paste material from the grids by treating the plates in a tumbling barrel made with small holes through which the friable salts, etc., can escape. This material includes a considerable portion of the sponge lead. The material escaping through the holes in the barrel I treat in a pulverizer so as to bring the salts and oxides and a portion of the sponge lead to a fine state of division and from this finely divided material I separate any comparatively large pieces of lead which can be subsequently smelted with the pieces of grid left in the barrel. The lead separated from the paste material I smelt first mixing with it a small amount of soda ash to flux the small percentage of lead sulphate adhering as a dust or otherwise to the lead.

The mixture of finely divided lead sulphate, lead peroxide and small amount of finely divided sponge lead, is analyzed to determine the amount of lead sulphate present and to a batch of such material I add an alkaline base preferably caustic soda or soda ash, in amount somewhat in excess of the chemical equivalent of lead sulphate present. In practice I have used twenty percent excess. I then charge the batch into a tank of boiling water, the temperature of which is lowered by the batch but rapidly raised again to the boiling point by steam. I find it advantageous to then turn off the steam and permit the contents of the tank to cool to about or below 150° F. and to then turn on the steam slowly, gradually raising the temperature to 212° F. and holding that temperature for about thirty minutes. At the end of this time I find that the reaction converting the lead sulphate to lead hydroxid or lead carbonate is complete. The alkali compound is, of course, dissolved in the water forming a solution, but by preference I add it to the batch dry as described. I wash the treated batch to remove sodium sulphate or other soluble salts and, after drying, charge the batch into a suitable oxidizing furnace where lead carbonate, if present, gives off its $CO_2$ and becomes lead monoxide, PbO, the lead peroxide is reduced to PbO, and the sponge lead is oxidized to PbO, the result being a pure lead oxide suitable for commercial use.

Where lead sulphate from other sources than battery plates is to be converted into a hydrate or carbonate, I mix with the sulphate in a fine state of division a small percentage of finely divided lead and treat the mixture in the same way I have described.

Having now described my invention, what I claim as new and desire to secure by Letters Patent, is:

1. The method of converting lead sulphate into a different lead compound which consists in mixing the sulphate in a fine state of division with a small percentage of finely divided metallic lead and boiling the mixture in a solution of an alkali-metal base to effect an exchange of bases.

2. The method of treating storage battery plates for the economic recovery of their component parts which consists in separating the lead grids and a large proportion of the sponge lead from the lead sulphate and lead peroxide components of the plates, treating the separated lead sulphate, lead peroxide and sponge lead, all in a state of fine division, with a hot solution of an alkali-metal base until an exchange of bases is effected, washing the treated material to remove soluble salts and heating the residue in an oxidizing furnace to convert its components into lead oxide.

3. The method of treating storage battery plates for the economic recovery of their component parts which consists in separating the lead grids and a large proportion of the sponge lead from the lead sulphate and lead peroxide components of the plates, treating the separated lead sulphate, lead peroxide and sponge lead, all in a state of fine division, with a hot solution of an alkali-metal base until an exchange of bases is effected, washing the treated material to remove soluble salts, heating the residue in an oxidizing furnace to convert its components into lead oxide and smelting the lead separated from the paste materials with a small percentage of an alkali-metal base to decompose adhering sulphate.

S. MARSHALL EVANS.